US006692348B1

(12) United States Patent  (10) Patent No.: US 6,692,348 B1
Cauthorne  (45) Date of Patent: Feb. 17, 2004

(54) METHODS AND SYSTEMS FOR CONTROLLING A MAILROOM ENVIRONMENT

(75) Inventor: Calvin Cauthorne, Glen Allen, VA (US)

(73) Assignee: Capital One Financial Corporation, Falls Church, VA (US)

( * ) Notice: Subject to any disclaimer, the term of this patent is extended or adjusted under 35 U.S.C. 154(b) by 0 days.

(21) Appl. No.: 10/216,280

(22) Filed: Aug. 12, 2002

(51) Int. Cl.[7] .............................................. F24F 7/007
(52) U.S. Cl. ..................... 454/230; 454/233; 55/385.2
(58) Field of Search ................................ 454/230, 233, 454/187, 251, 252, 239, 229, 232; 55/385.2, 467.1, 467; 414/935

(56) References Cited

U.S. PATENT DOCUMENTS

| | | | | |
|---|---|---|---|---|
| 5,257,736 A | * | 11/1993 | Roy ........................... | 236/49.3 |
| 5,292,280 A | * | 3/1994 | Janu et al. ................. | 454/229 |
| 5,586,932 A | * | 12/1996 | Kiser .......................... | 454/229 |
| 5,779,538 A | * | 7/1998 | Jardinier ..................... | 454/256 |
| 5,791,983 A | * | 8/1998 | Robertson ................... | 454/229 |
| 5,972,060 A | * | 10/1999 | O'Halloran et al. ....... | 55/385.2 |
| 6,217,441 B1 | | 4/2001 | Pearman et al. ........... | 454/333 |
| 6,227,961 B1 | * | 5/2001 | Moore et al. ............... | 454/229 |
| 6,293,861 B1 | | 9/2001 | Berry .......................... | 454/255 |
| 6,368,393 B1 | * | 4/2002 | Hironaka ..................... | 96/111 |
| 6,371,846 B1 | | 4/2002 | Powell et al. ............... | 454/271 |
| 6,406,367 B1 | * | 6/2002 | Chou et al. .................. | 454/233 |
| 6,517,429 B1 | * | 2/2003 | O'Connell et al. .......... | 454/56 |

OTHER PUBLICATIONS

CDC Health Advisory, "CDC Interim Recommendations for Protecting Workers from Exposure to Bacillus anthracis in Work Sites Where Mail is Handled or Processed," www.bt.cdc.gov, Oct. 31, 2001.

* cited by examiner

Primary Examiner—Derek Boles
(74) Attorney, Agent, or Firm—Finnegan, Henderson, Farabow, Garrett & Dunner L.L.P.

(57) ABSTRACT

The present invention generally relates to mail processing and environment control. Systems for controlling a mail-processing environment to protect against contaminants may comprise a first air vent for supplying air to the mail-processing environment, a second air vent for exhausting air from the mail-processing environment, an air exchanger coupled to the first air vent and the second air vent for exchanging air in the environment, a first damper for substantially blocking air supplied to the environment through the first air vent, a second damper for substantially blocking air exhausted from the environment through the second air vent, and a control circuit for controlling the first damper and the second damper in response to a possible presence of contaminants in the mail-processing environment.

34 Claims, 3 Drawing Sheets

METHODS AND SYSTEMS FOR CONTROLLING A MAILROOM ENVIRONMENT

BACKGROUND

1. Field of the Invention

The present invention generally relates to mail-processing and, more particularly, to controlling a mail-processing environment to protect against contaminants.

2. Brief Description of the Related Art

Recent incidents involving anthrax contamination in the United States postal service have increased anxiety about handling mail. In the case of organizations that receive large volumes of mail on a daily basis, more expressed concerns arise for their employees. Specifically, the nature of mail-processing jobs places mailroom personnel at a greater risk of infection and exposure to contaminants hidden in mail. Many organizations have implemented measures, such as requiring the use of latex gloves by mailroom personnel, to help mitigate this threat, but these measures only protect against physical contact with the contaminants. They do not protect against other modes of transmission, such as inhalation or ingestion.

Besides the health risks posed to personnel, the shutting down of an organization's facility due to a possible biological attack creates a significant economic burden on the organization. Further, a proliferation of hoax attacks makes it imperative for an organization to implement effective and efficient mechanisms that will prevent needless work stoppages, while protecting itself from the possible spread of contamination. Accordingly, there exists a need for an improved way to protect mail-processing environments from contamination due, for example, to airborne hazardous substances.

SUMMARY

Methods, systems, and articles of manufacture of the present invention may control a mail-processing environment to protect against contaminants.

One exemplary aspect of the invention may relate to a system for controlling a mail-processing environment to protect against contaminants. The system may comprise a first air vent for supplying air to the mail-processing environment, a second air vent for exhausting air from the mail-processing environment, an air exchanger coupled to the first air vent and the second air vent for exchanging air in the environment, a first damper for substantially blocking air supplied to the environment through the first air vent, a second damper for substantially blocking air exhausted from the environment through the second air vent, and a control circuit for controlling the first damper and the second damper in response to a possible presence of contaminants in the mail-processing environment.

A second aspect of the invention may relate to a method for controlling a mail-processing environment to protect against contaminants, wherein the mail-processing environment includes a mail-processing workstation. The method may comprise detecting whether contaminants are present in the mail-processing environment, controlling a first damper coupled to a first air vent to substantially block air flow from the environment through the first air vent, and controlling a second damper coupled to a second air vent to substantially block air flow to the environment through the second air vent. The first and second dampers may be controlled in response to a detection of a possible contaminant in the mail-processing environment.

Additional embodiments and aspects of the invention are set forth in the detailed description which follows, and in part are obvious from the description, or may be learned by practice of methods, systems, and articles of manufacture consistent with the present invention. It is understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Reference is now made in detail to exemplary embodiments of the invention, examples of which are illustrated in the accompanying drawings. Wherever possible, the same reference numbers are used throughout the drawings to refer to the same or like parts.

Figure 1:
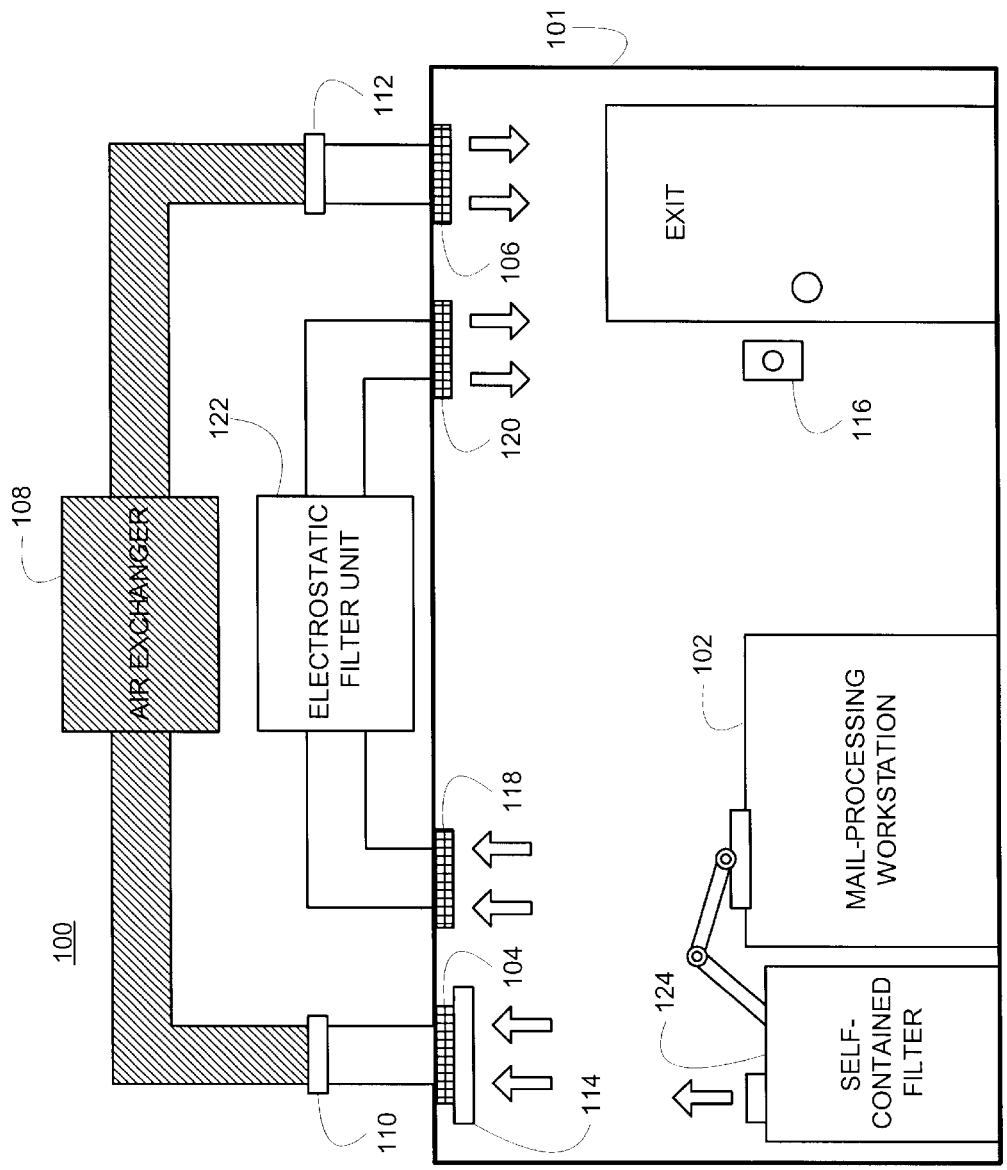
FIG. 1 illustrates an exemplary environment control system, consistent with features and principles of the present invention, for controlling a mail-processing environment to protect against contaminants.

FIG. 1 illustrates an exemplary system 100, consistent with features and principles of the present invention, for controlling a mail-processing environment 101 to protect against contaminants. In one embodiment of the present invention, system 100 may comprise a mail-processing workstation 102, a first air vent 104, a second air vent 106, an air exchanger 108, a first damper 110, a second damper 112, a filter 114, and a control circuit 116.

Environment 101 may be any room, tent, or any other structure for processing mail that may be at risk to exposure to contaminants. For example, mail processed in environment 101 may contain contaminants that may be released into the environment when the mail is processed. Contaminants may include biological contaminants (e.g., anthrax), chemical contaminants (e.g., sarin), or any other toxic, hazardous, or unwanted material in the workplace. Mail-processing workstation 102 may be any system for receiving, sorting, opening, or handling mail. Examples of mail-processing workstation 102 may include a mail-sorting machine, an envelope extraction machine, or any other type of automatic mail-processing machine. Further, mail-processing workstation 102 may also refer to a workstation desk area for personnel processing mail by hand.

Air vents 104 and 106 may be any mechanism that allows air to flow into or out of environment 101. For example, air vents 104 and 106 may include an aperture, a portal, a grate, a screen, or any partially covered opening that allows air to pass from or to environment 101. Air exchanger 108 may, in turn, be any device for circulating air. For example, air exchanger 108 may be a standard heating/ventilation/air conditioning (HVAC) system, a fan, or a vacuum system.

As shown in FIG. 1, first air vent 104 and second air vent 106 are coupled to air exchanger 108 through a system of air ducts. The air ducts may include pipes, hoses, conventional ductwork, or any other mechanism or structure for directing airflow. As known by one of ordinary skill in the air ventilation art, air vent 104 may exhaust air from environment 101 to air exchanger 108, which may then supply fresh air back to environment 101 through air vent 106.

In systems consistent with the present invention, the air duct between first air vent 104 and air exchanger 108 may include a first damper 110 and the air duct between second air vent 106 and air exchanger 108 may include a second damper 112. Dampers 110 and 112 may operate to substantially block air leaving or entering environment 101 through vents 104 and 106, respectively. Further, dampers 110 and 112 may be installed using caulk or other sealing mechanisms to prevent uncontrolled airflow (e.g., leaks around edges of dampers, drafts, etc.). In an exemplary embodiment, dampers 110 and 112 may isolate the air of environment 101 from that of other environments or rooms connected to the same air exchanger 108. Dampers 110 and 112 may be implemented using a number of devices or mechanisms that can substantially block air flow from or to environment 101. For instance, dampers 110 and 112 may comprise a smoke damper or an air damper. In an exemplary embodiment, dampers 110 and 112 may be a two-position, direct-coupled air damper with a built-in motorized activator. The activator may be operated to open/close the damper according to the methodology described below.

In an exemplary embodiment, vent 104 may be provided with a filter 114 to filter air leaving environment 101. More particularly, filter 114 may remove possible contaminants from environment 101, thus helping to prevent further contamination to areas outside of environment 101. Filter 114 may be implemented by using a HEPA filter, a carbon filter, or other type of filter. While FIG. 1 shows only one filter 114 operatively coupled with vent 104, systems consistent with the invention may use more than one filter, and may operatively couple a filter at other locations and in other vents, for instance by using a filter operatively coupled with vent 106.

Control circuit 116 may control the operation of first damper 110 and second damper 112 based upon the detection of a possible contamination to environment 101. When a contaminating event is detected, control circuit 116 may control dampers 110 and 112 to substantially block air from leaving or entering environment 101. Control circuit 116 may be implemented by using a panic button, a switch, or an emergency power off (EPO) switch that controls the operation of dampers 110 and 112.

Control circuit 116 may be manually operated by an operator (not shown) who detects the contaminating event. A contaminating event may be any indication of an exposure, a possible exposure, or a threat of exposure to a contaminant in mail-processing environment 101. For example, an operator may find powder in a piece of mail, notice a suspicious package in environment 101, or see a puff of powder come from mail-processing workstation 102. The operator may then proceed to operate control circuit 116 to close dampers 110 and 112 to substantially block air from leaving or entering environment 101. Control circuit 116 may also be connected to mail-processing workstation 102. When a contaminating event is detected, control circuit 116 may thus, also stop operation of workstation 102.

In an alternative embodiment, control circuit 116 may also be connected to a sensor (not shown) for detecting hazardous substances in environment 101. When the sensor detects a possible contamination, the sensor may then automatically activate control circuit 116 to, in turn, control the operation of workstation 101 and dampers 110 and 112, as described above. In either embodiment, control circuit 116 may be connected to workstation 101 and dampers 110 and 112 by using any type of connection, including electromagnetic connections (such as wires or wireless links) or physical connections (such as springs, levers, or cables).

During operation of system 100, air from environment 101 may flow through first air vent 104 to air exchanger 108 and air from air exchanger 108 may flow through second air vent 106 to environment 101 in order to cycle the air in environment 101. As the air is cycled, mail-processing workstation 102 may sort, open, or otherwise handle mail. Further, filter 114 may filter any air flowing through first air vent 104 or second air vent 106, to thereby remove contaminants in the air of environment 101 or prevent contaminants from entering environment 101.

If an operator detects possible contaminants in mail that will be processed, is being processed, or has been processed by mail-processing workstation 102, the operator may operate control circuit 116 to close dampers 110 and 112, and/or stop mail-processing workstation 102 from processing any additional mail. Alternatively, as described above, control circuit 116 may be connected to a sensor (not shown) that detects contaminants in environment 101 before automatically triggering control circuit 116 to close dampers 110 and 112, and/or stop mail-processing workstation 102 from processing any more mail. Closing dampers 110 and 112 deadens the circulation of air through air vents 104 and 106 in environment 101 and also prevents any possibly contaminated air from substantially moving out of or into environment 101. At the same time, control circuit 116 may prevent further exposure to the contamination by stopping mail-processing workstation 102, by turning off the power to mail-processing workstation 102, or otherwise deactivating it. Further, control circuit 116 may also trigger a warning alarm that indicates a possible contamination has been detected.

Because environment 101 is thus substantially sealed off from any other environments or rooms associated with air exchanger 108 (i.e., other rooms in the same building), those other mail-processing work areas may continue to process mail. Accordingly, systems consistent with the invention may prevent the shutting down of operations in other areas or environments due to a contaminating event by blocking off the contaminated environment 101, and thereby allowing mail-processing to continue in other areas. For example, a facility may have a production area and several mail-processing areas. System 100 may be implemented in the mail-processing areas. If a contaminating event occurs in one of the mail-processing areas, system 100 may use air dampers 110 and 112 to separate the ventilation system of the contaminated mail-processing area from the remaining areas. Thus, the remaining mail-processing and production areas may continue operating with little risk of exposure to the contaminants.

FIG. 1 further illustrates how in another embodiment of the present invention, system 100 may comprise a third air vent 118, a fourth air vent 120, and an electrostatic filter unit 122. Air ducts, as previously described, may couple third air vent 118 and fourth air vent 120 to electrostatic filter unit 122. Electrostatic filter unit 122 may be any type of electrostatic filter known in the art, such as a dust collector or an electrostatic HEPA filter unit. Such filters charge air particles (including any contaminants) to cause those particles to agglomerate and make them easier to filter out of the air. As described below, control circuit 116 may control the operation of electrostatic filter unit 122.

While mail-processing workstation 102 is processing mail, electrostatic filter unit 122 may charge particles in the air circulating in environment 101 to make the particles easier to filter. Air from environment 101 may flow through third air vent 118 to electrostatic filter unit 122 and back into environment 101 through fourth air vent 120 in order to charge the particles. Electrostatic filter unit 122 may also use a filter (similar to filter 114) to further remove any contaminants from the air.

If an operator detects possible contaminants in mail that will be processed, is being processed, or has been processed by mail-processing workstation 102, the operator may operate control circuit 116 to deactivate electrostatic filter unit 122 in order to deaden the circulation of air through air vents 118 and 120 in environment 101. Or, the operator may let the electrostatic filter unit 122 continue operating to facilitate removal of the possible contaminant. Alternatively, and as described above, control circuit 116 may include a sensor for detecting contaminants in environment 101 and to automatically trigger the activation of control circuit 116.

FIG. 1 further illustrates how in another embodiment of the present invention, system 100 may also include a self-contained filter 124 connected to mail-processing workstation 102. Self-contained filter 124 may be any stand-alone system, such as a portable air HEPA filter unit, that directly filters air contaminants from or near mail-processing workstation 102. Self-contained filter 124 may be situated in close proximity to mail-processing workstation 102 or directly coupled to mail-processing workstation 102 via air ducts or hoods. Control circuit 116 may control the operation of self-contained filter 124.

A fan or other mechanism (not shown) in self-contained filter 124 may pull air through a hood into self-contained filter 124. Self-contained filter 124 may then filter the air and allow the filtered air to be exhausted back into environment 101. If an operator or sensor detects possible contaminants in the mail-processing environment of workstation 102, the operator or sensor may then operate control circuit 116 to deactivate self-contained filter unit 124 in order to deaden the air circulation caused by self-contained filter unit 124 in environment 101. Alternatively, The operator or sensor may also let the self-contained filter 124 continue operating to facilitate removal of the possible contaminant.

Figure 2:
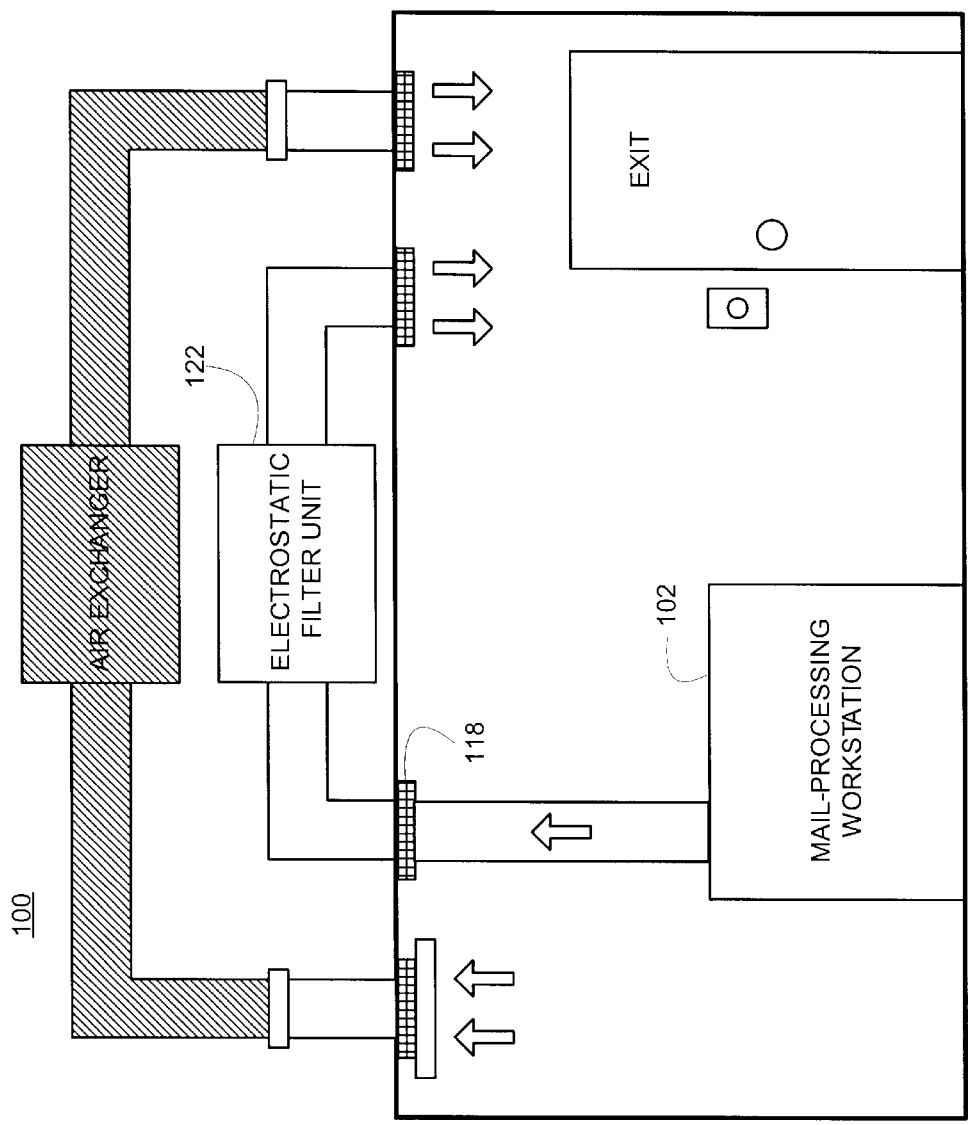
FIG. 2 illustrates an alternative exemplary environment control system, consistent with features and principles of the present invention, for controlling a mail-processing environment to protect against contaminants.

FIG. 2 illustrates another mail-processing environment consistent with the present invention. As shown in FIG. 2, system 100 may alternatively or additionally include an air duct coupled between third air vent 118 and mail-processing workstation 102. A fan or other mechanism (not shown) in electrostatic filter unit 122 may draw air from mail-processing workstation 102 through third air vent 118 to then filter it, as described above, and send the filtered air back to environment 101. If an operator or sensor detects possible contaminants in the mail-processing environment of workstation 102, the operator or sensor may trigger control circuit 116 to stop electrostatic filter unit 122 from charging or filtering particles in environment 101 in order to deaden the air flow through air vents 118 and 120 in environment 101. Or, the operator may let the electrostatic filter 122 continue operating to facilitate removal of the possible contaminant.

While FIGS. 1 and 2 describe electrostatic filter units 122 dedicated to environment 101, electrostatic filter units 122 may also be used to filter the air for other environments or areas as well. In such cases, the air ducts coupling electrostatic filter units 122 to environment 101 may include dampers similar to those of dampers 110 and 112 to isolate environment 101 from these other areas and environment.

Figure 3:
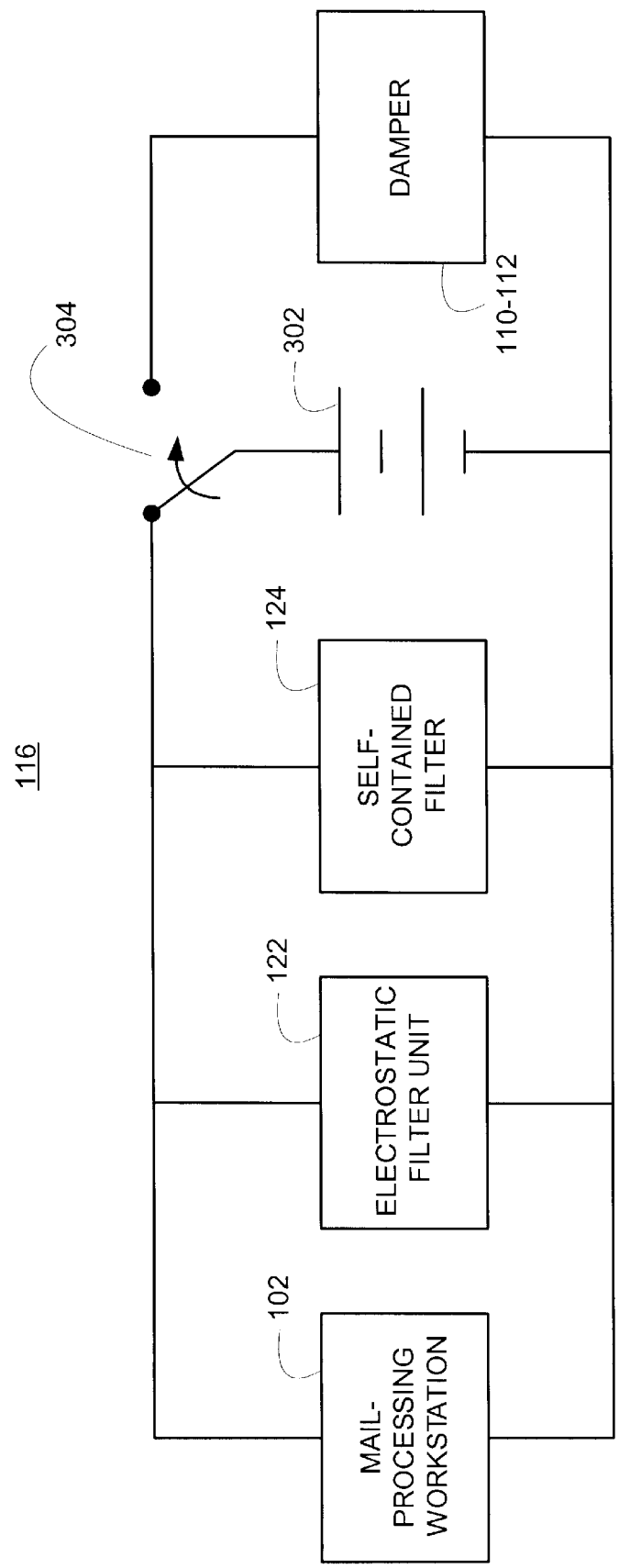
FIG. 3 illustrates an exemplary control circuit, consistent with features and principles of the present invention, in a system for controlling a mail-processing environment to protect against contaminants.

FIG. 3 illustrates an exemplary embodiment of a control circuit 116 consistent with the present invention. As shown in FIG. 3, control circuit 116 may include a power source 302 that is connected, via switch 304, to either mail-processing workstation 102, electrostatic filter unit 122, self-contained filter 124, or to dampers 110 and 112. When processing mail, power source 302 may provide power to mail-processing workstation 102, electrostatic filter unit 122, and self-contained filter 124 via a switch 302. If an operator or sensor detects contaminants in environment 101 (FIG. 1), the operator or sensor may flip switch 304 to an alternate state that cuts power to mail-processing workstation 102, electrostatic filter unit 122, and/or self-contained filter 124. The alternate state of switch 304 may then activate dampers 110 and 112 to cause them to substantially block air flow from and to environment 101, as described above. Further, the switch 304 may also trigger an alarm (not shown) when activating the dampers. As one of ordinary skill in the art can appreciate, other control circuits may be used to control mail-processing workstation 102, electrostatic filter unit 122, self-contained filter 124, or dampers 110–112.

In the foregoing description, various features are grouped together in various embodiments for purposes of streamlining the disclosure. This manner of disclosure is not to be interpreted as reflecting an intention that the claimed invention requires more features than may be expressly recited in each claim. Rather, as the following claims reflect, inventive aspects may lie in less than all features of a single foregoing disclosed embodiment. Thus, the following claims are hereby incorporated into this description, with each claim standing on its own as a separate embodiment of the invention. Further, the word "or" may be used herein in the conjunctive or the disjunctive sense.

Also in the foregoing description, various embodiments of the invention may be used to control a mail-processing environment in order to mitigate the risks of processing mail that may contain possible contaminants. It should be understood, however, that systems consistent with the invention may not provide complete and absolute protection against all contaminants.

What is claimed is:

1. A system for controlling a mail-processing environment to protect against contaminants, wherein the mail-processing environment includes a mail-processing workstation, the system comprising:
   a first air vent for supplying air to the mail-processing environment;
   a second air vent for exhausting air from the mail-processing environment;
   an air exchanger coupled to the first air vent and the second air vent for exchanging air in the environment;
   a first damper for substantially blocking air supplied to the environment through the first air vent;
   a second damper for substantially blocking air exhausted from the environment through the second air vent; and
   a control circuit for controlling the first damper and the second damper in response to a possible presence of contaminants in the mail-processing environment.

2. The system of claim 1, wherein when a possible contamination of the mail-processing environment is detected, the control circuit causes the first and second dampers to substantially block air supplied to and exhausted from the environment through the first and second air vents, respectively.

3. The system of claim 2, wherein the control circuit is automatically activated when a sensor detects contaminants in the mail-processing environment.

4. The system of claim 2, wherein the control circuit further controls the mail-processing workstation, and when a possible contamination of the mail-processing environment is detected, the control circuit further causes the mail-processing workstation to stop processing mail.

5. The system of claim 1, further comprising
a filter connected to at least one of the first air vent and the second air vent for filtering the air passing through the at least one air vent.

6. The system of claim 5, wherein the filter is chosen from at least one of a HEPA filter, and a carbon filter.

7. The system of claim 1, further comprising
a self-contained filter for filtering air from the environment of the mail-processing workstation, and
wherein the control circuit controls operation of the self-contained filter.

8. The system of claim 7, wherein the control circuit causes the self-contained filter to stop filtering in response to a possible contamination of the mail-processing environment.

9. The system of claim 7, wherein when a possible contamination of the mail-processing environment is detected, the control circuit causes the first and second dampers to substantially block air supplied to and exhausted from the environment through the first and second air vents, respectively, and causes the self-contained filter to stop filtering.

10. The system of claim 9, wherein the control circuit is automatically activated when a sensor detects contaminants in the mail-processing environment.

11. The system of claim 1, further comprising
an electrostatic filter for filtering air from the environment of the mail-processing workstation, and wherein the control circuit controls operation of the electrostatic filter.

12. The system of claim 11, wherein the control circuit causes the electrostatic filter to stop filtering in response to a possible contamination of the mail-processing environment.

13. The system of claim 11, wherein when a possible contamination of the mail-processing environment is detected, the control circuit causes the first and second dampers to substantially block air supplied to and exhausted from the environment through the first and second air vents, respectively, and causes the electrostatic filter to stop filtering.

14. The system of claim 13, wherein the control circuit is automatically activated when a sensor detects contaminants in the mail-processing environment.

15. The system of claim 1, wherein when a possible contamination of the mail-processing environment is detected, the control circuit triggers an alarm.

16. The system of claim 1, wherein the dampers are sealed to substantially prevent at least one of uncontrolled airflow from the environment and uncontrolled air flow to the environment.

17. The system of claim 1, wherein the dampers are chosen from at least one of smoke dampers, and air dampers.

18. A method for controlling a mail-processing environment to protect against contaminants, wherein the mail-processing environment includes a mail-processing workstation, the method comprising:
detecting whether contaminants may be present in the mail-processing environment;
controlling a first damper coupled to a first air vent, wherein the first damper is controlled, in response to a detection of a possible contaminant in the mail-processing environment, to substantially block air flow from the environment through the first air vent; and
controlling a second damper coupled to a second air vent, wherein the second damper is controlled, in response to the detection of a possible contaminant in the mail-processing environment, to substantially block air flow to the environment through the second air vent.

19. The method of claim 18, further comprising:
detecting a possible contamination of the mail-processing environment; and
causing the first and second dampers to substantially block air supplied to and exhausted from the environment through the first and second air vents, respectively.

20. The method of claim 19, further comprising
controlling the mail-processing workstation situated in the environment using a control circuit, wherein the mail-processing workstation is deactivated in response to the detection of a possible contaminant in the mail-processing environment.

21. The method of claim 18, further comprising:
causing the first and second dampers to substantially block air supplied to and exhausted from the environment through the first and second air vents, respectively,
when a sensor detects contaminants in the mail-processing environment.

22. The method of claim 18, further comprising
filtering air in the environment using a filter connected to at least one of the first air vent and the second air vent.

23. The method of claim 22, wherein the filter is chosen from at least one of a HEPA filter, and a carbon filter.

24. The method of claim 18, further comprising:
filtering air from the environment of the mail-processing workstation using a self-contained filter, and
controlling the self-contained filter using the control circuit.

25. The method of claim 24, further comprising
causing the self-contained filter to stop filtering in response to a possible contamination of the mail-processing environment.

26. The method of claim 24, further comprising:
causing the first and second dampers to substantially block air supplied to and exhausted from the environment through the first and second air vents, respectively; and
causing the self-contained filter to stop filtering,
when a possible contamination of the mail-processing environment is detected.

27. The method of claim 24, further comprising:
causing the first and second dampers to substantially block air supplied to and exhausted from the environment through the first and second air vents, respectively; and causing the self-contained filter to stop filtering, when a sensor detects contaminants in the mail-processing environment.

28. The method of claim 18, further comprising:

filtering air from the environment of the mail-processing workstation using an electrostatic filter; and controlling the electrostatic filter using the control circuit.

29. The method of claim 28, further comprising causing the electrostatic filter to stop filtering in response to a possible contamination of the mail-processing environment.

30. The method of claim 28, further comprising:

causing the first and second dampers to substantially block air supplied to and exhausted from the environment through the first and second air vents, respectively; and causing the electrostatic filter to stop filtering, when a possible contamination of the mail-processing environment is detected.

31. The method of claim 28, further comprising:

causing the first and second dampers to substantially block air supplied to and exhausted from the environment through the first and second air vents, respectively; and causing the electrostatic filter to stop filtering, when a sensor detects contaminants in the mail-processing environment.

32. The method of claim 18, further comprising triggering an alarm, when a possible contamination of the mail-processing environment is detected.

33. The method of claim 18, further comprising sealing the dampers to substantially prevent at least one of uncontrolled airflow from the environment and uncontrolled airflow to the environment.

34. The method of claim 18, wherein the dampers are chosen from at least one of smoke dampers, and air dampers.

* * * * *